United States Patent
Chen et al.

(10) Patent No.: US 10,072,203 B2
(45) Date of Patent: Sep. 11, 2018

(54) METHOD OF INCREASING SCALE INHIBITOR RETENTION

(71) Applicant: Ecolab USA Inc., St. Paul, MN (US)

(72) Inventors: Ping Chen, Scotland (GB); Harry Montgomerie, Scotland (GB); Stephen Mark Heath, Scotland (GB); Olav Vikane, Stqavanger (NO); Bjorn Juliussen, Hundvag (NO); Thomas Hagen, Delden (NL)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/191,201

(22) Filed: Jun. 23, 2016

(65) Prior Publication Data

US 2017/0002258 A1 Jan. 5, 2017

Related U.S. Application Data

(63) Continuation of application No. 14/239,034, filed as application No. PCT/GB2012/052364 on Sep. 25, 2012.

(30) Foreign Application Priority Data

Sep. 26, 2011 (GB) .................................. 1116530.5

(51) Int. Cl.
| | |
|---|---|
| *E21B 37/06* | (2006.01) |
| *C09K 8/52* | (2006.01) |
| *C09K 8/528* | (2006.01) |
| *C09K 8/524* | (2006.01) |

(52) U.S. Cl.
CPC .............. *C09K 8/528* (2013.01); *C09K 8/524* (2013.01); *E21B 37/06* (2013.01); *C09K 2208/00* (2013.01)

(58) Field of Classification Search
CPC ............ E21B 37/06; C09K 8/52; C09K 8/528
See application file for complete search history.

(56) References Cited

U.S. PATENT DOCUMENTS

| | | |
|---|---|---|
| 3,349,032 A | 10/1967 | Krieg |
| 5,038,861 A | 8/1991 | Shuler |
| 5,181,567 A | 1/1993 | Shuler |
| 7,703,516 B2 | 4/2010 | Hills et al. |
| 2008/0248974 A1 | 10/2008 | Chen et al. |
| 2009/0143258 A1 | 6/2009 | Welton et al. |
| 2010/0273682 A1 | 10/2010 | Montgomerie et al. |

FOREIGN PATENT DOCUMENTS

| | | |
|---|---|---|
| EP | 2 052 050 B1 | 12/2010 |
| WO | 2004/011772 A1 | 2/2004 |

OTHER PUBLICATIONS

Sutherland, L., et al., "Enhancing Scale Inhibitor Squeeze Retention with Additives," Conference Paper presented at SPE International Oilfield Scale Conference and Exhibition, Aberdeen, Scotland, United Kingdom, May 11-12, 2016, pp. 1-17, Society of Petroleum Engineers.

*Primary Examiner* — Catherine Loikith
(74) *Attorney, Agent, or Firm* — Senniger Powers LLP (57) ABSTRACT

A method for increasing the retention of a scale inhibitor within a hydrocarbon producing system by (i) pre-flushing the system with a liquid; (ii) treating the system with a scale inhibitor; and (iii) over-flushing the system with a composition comprising an ionic polymer and a liquid carrier. The concentration of the ionic polymer in the composition is 5 to 50% wt.

12 Claims, 2 Drawing Sheets

METHOD OF INCREASING SCALE INHIBITOR RETENTION

CROSS-REFERENCE TO RELATED APPLICATION

This application is a continuation of U.S. patent application Ser. No. 14/239,034, filed on Feb. 14, 2014, which is a U.S. National Stage of PCT/GB2012/052364 filed Sep. 25, 2012, which claims priority to United Kingdom Patent Application No. 1116530.5 filed Sep. 26, 2011, the entire content of which are incorporated herein by reference.

FIELD OF THE INVENTION

This invention relates to a method of controlling scale deposition in a hydrocarbon well, and in particular, to a method of increasing the retention of a scale inhibitor on a rock comprising a subterranean formation.

BACKGROUND OF THE INVENTION

During the operation of a hydrocarbon well (i.e. a gas or oil well) various down-hole problems can arise including the deposition of scale which inhibits the hydrocarbon flow. In the North Sea, typical scale problems are related to the production of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole.

To prevent scale from forming in the system, a scale inhibitor is typically injected into the formation intermittently in so called "squeeze" treatments. In a "squeeze" treatment, a scale inhibitor, typically at concentrations between 5-20% by weight, is injected into the formation through a producer well hole after a pre-flush. After an over-flush and shut-in, well production is then resumed. Ideally the production water slowly leaches or washes out the retained scale inhibitor from the formation. More specifically the leaching process should ideally place a low, but still effective, concentration (e.g. around 1-100 ppm) of the scale inhibitor in the produced water to prevent scale deposition. Depending on the inhibitor retention and release properties in the formation, however, the effect of this treatment may last from one month to about 24 months. For economic reasons, a prolonged period of protection from scale formation is clearly desirable.

An ideal scale inhibitor return curve for scale inhibitor concentration is one where, after the over-flush is complete, the inhibitor desorbs into the produced water at a rate that provides a constant concentration that is the minimum required to prevent scale formation. Even more ideally, this process continues until all of the scale inhibitor squeezed into the formation is released in this way.

Typically, however, squeeze treatments do not provide ideal scale inhibitor return curves. Usually the concentration of scale inhibitor in the produced water is initially high, and much greater than that required to prevent scale formation, as a result of inhibitor failing to adsorb to the formation. Thereafter the concentration of scale inhibitor tends to decrease until it eventually falls below the minimum required to prevent scale deposition. The process is therefore inefficient as a large proportion of the inhibitor introduced in the squeeze treatment is returned almost immediately and does not serve to prevent scale deposition. Moreover regular repetition of scale inhibitor treatment is highly undesirable as oil production invariably needs to be stopped to allow the treatment to be carried out.

Various techniques have been used to try to increase the proportion of scale inhibitor that is retained in a well. For example, U.S. Pat. No. 5,181,567 and U.S. Pat. No. 5,038,861 each disclose a method of prolonging the useful life of scale inhibitors in oil wells that employs polyquaternary amines such as poly-(dimethylamine-co-epichlorohydrin) or poly-(diallyldimethylammonium chloride). In a typical process, an amine solution is injected into a well, followed by injection of a scale inhibitor. An over-flush of brine, also referred to as "a water flush", is then applied. The well is then shut in for 20-24 hours before production recommences. There is no explanation provided as to how the polyquaternary amine functions to prolong the scale inhibitor life.

EP-A-2052050 also discloses a method of increasing the retention of a scale inhibitor within a hydrocarbon producing system wherein the system is contacted with a polymer formed from a diallyl ammonium salt and with a scale inhibitor. EP-A-2052050 teaches that the polymer formed from a diallyl ammonium salt and the scale inhibitor are preferably formulated in separate liquid carriers and that the polymer formed from the diallyl ammonium salt is preferably injected before the injection of the scale inhibitor. This is said to be advantageous as it allows the polymer to adsorb onto the rock before it interacts with scale inhibitor. It is described in EP-A-2052050 that the polymer and the scale inhibitor form a gel in situ. This gel is believed to act like a precipitate in that it is easily retained by the hydrocarbon producing system. The reaction to form the gel is, however, believed to be reversible therefore when the concentration of scale inhibitor in the production water decreases, some gel will dissolve thereby releasing scale inhibitor. One reason EP-A-2052050 advocates treating the formation with a polymer formed from a diallyl ammonium salt prior to injection of a scale inhibitor is to ensure that this gel forms at the formation surface. This physically prevents scale deposition from occurring and means that the chance of pore blockage occurring is reduced.

EP-A-2052050 mentions the possibility of combining the above-described treatment steps with pre-flush and/or after or over-flush steps. The field treatment test disclosed in EP-A-2052050, for example, discloses a squeeze treatment according to the following protocol:

Preflush: 10 m$^3$ 2% KCl (to prevent clay swelling)
Preflush 2: 60 m$^3$ 10% DADMAC homopolymer in 6% NaCl
Main pill: 220 m$^3$ 5% scale inhibitor in seawater
Over-flush: 200 m$^3$ (0.1% inhibitor in seawater)
Shut in: 12 hours It is taught in EP-A-2052050 that an over-flush is typically done following the addition of the polymer formed from a diallyl ammonium salt and scale inhibitor and that it serves to displace the polymer/scale inhibitor out of the well bore. In other words the purpose of the over-flush is simply to push the treatment solutions into the formation. The over-flush composition therefore typically comprises brine.

Despite the improvements in squeeze lifetime provided by the above-described methods, there is still a need for methods for further increasing the retention of scale inhibitors in oil wells, and in particular, for methods that further extend the effect of a squeeze treatment. In addition the methods should not damage the formation (e.g. significantly reduce permeability) and, due to increased environmental concerns, the chemicals employed should exhibit good biodegradation properties with low toxicity and low bioaccumulation.

It has now been found that the lifetime of scale inhibitor squeeze treatments can be improved by incorporating an ionic polymer such as a polyquaternary amine or polyamino acid into the over-flush, i.e. after the main treatment has been carried out. Advantageously such methods have been found to further extend the squeeze lifetime of those treatments disclosed in U.S. Pat. No. 5,181,567, U.S. Pat. No. 5,038,861 and EP-A-2052050 wherein a polymer for enhancing squeeze lifetime is included in the pre-flush and/or treatment step. The finding that the inclusion of an ionic polymer in the over-flush improves scale inhibitor lifetime is surprising since the conventional wisdom in the art is that the over-flush simply serves to push or displace the treatment composition into the formation.

SUMMARY OF THE INVENTION

Thus viewed from a first aspect the invention provides a method for increasing the retention of a scale inhibitor within a hydrocarbon producing system, said method comprising the steps of:
(i) pre-flushing said system with a liquid;
(ii) treating said system with a scale inhibitor; and
(iii) over-flushing said system with an ionic polymer (e.g. a polyquaternary amine).

In a preferred embodiment of the method of the invention, said pre-flushing step and/or said treating steps further comprises contacting said system with an ionic polymer (e.g. a polyquaternary amine). In some preferred embodiments, said pre-flushing step comprises contacting said system with an ionic polymer (e.g. a polyquaternary amine). In other preferred embodiments, said treating step further comprises treating said system with an ionic polymer (e.g. a polyquaternary amine). Although the pre-flushing and treating steps may both comprise contacting said system with an ionic polymer (e.g. a polyquaternary amine), preferably only one of these steps comprises contacting said system with an ionic polymer (e.g. a polyquaternary amine).

Viewed from a further aspect, the present invention provides a method of producing hydrocarbon from a hydrocarbon producing system comprising:
(a) treating said system with a method as hereinbefore defined; and
(b) placing said system back on production.

Viewed from a still further aspect the invention provides an over-flush composition comprising (e.g. consisting essentially of) a carrier liquid and an ionic polymer (e.g. a polyquaternary amine) as hereinbefore defined.

DESCRIPTION OF THE PREFERRED EMBODIMENTS

As used herein the term "scale" is intended to encompass any precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$.

The term "hydrocarbon producing system" is used herein to encompass the subterranean formation (e.g. rock) from which hydrocarbon is extracted as well as the equipment used in the extraction process. The formation may be a gas or oil well, although the method is particularly suitable for treatment of oil wells. The equipment includes both subsurface and surface equipment (e.g. tubes, pipes, pumps, valves, nozzles, storage containers, screens, etc).

The term "squeeze treatment" is used herein to describe a treatment comprising (i) a pre-flush step, (ii) a treatment step and (iii) an over-flush step. Preferred squeeze treatments comprise a further step of shut in. Preferred methods of the invention increase the retention of a scale inhibitor within a hydrocarbon system that is applied in a squeeze treatment.

As used herein the term "pre-flush" is used to describe a method step in which a formation is conditioned to undergo treatment with at least a scale inhibitor. The purpose of the pre-flush is typically to wet the surface of the formation. For example, if the formation is oil-rich the pre-flush is carried out to aid subsequent retention of hydrophilic treatment agents such as scale inhibitors. In preferred methods, the pre-flush additionally comprises contacting the hydrocarbon producing system with an ionic polymer (e.g. a polyquaternary amine).

As used herein the term "treatment" is used to describe a method step in which the hydrocarbon producing system is contacted with at least a scale inhibitor. In preferred methods, the treatment additionally comprises contacting the hydrocarbon producing system with an ionic polymer (e.g. a polyquaternary amine).

As used herein the term "over-flush" is used to describe a method step in which a fluid is introduced into the hydrocarbon producing system to push, force or displace the scale inhibitor and/or ionic polymer (e.g. a polyquaternary amine) used in the treatment out of the wellbore and into the formation.

Each of the terms "pre-flush", "treatment" and "over-flush" is intended to encompass a method step that may comprise one or more stages. Thus, for example, the treatment may comprise introduction of an ionic polymer (e.g. a polyquaternary amine) and then introduction of a scale inhibitor. The two stages together comprise the treatment. Similarly the over-flush may comprise a flush with an ionic polymer (e.g. a polyquaternary amine) as hereinbefore described followed by a flush with brine. The two stages together comprise the over-flush.

The methods of the present invention require the pre-flush, treatment and over-flush steps to be carried out separately. Thus the method of the invention comprises at least three steps. It also preferably comprises the injection of at least three different compositions (a pre-flush, a treatment and an over-flush) into the formation.

As used herein the term "shut in" is used to describe a method step in which the hydrocarbon producing system is closed for a period of time (i.e. there is no input or output from the system). The purpose of the shut in is to allow the chemicals previously introduced therein time to react and/or interact with the formation.

Over-Flush Step

In squeeze treatments the over-flush step is conventionally used to force treatment compositions into the formation. This is necessary because treatment compositions are usually delivered to the wellbore and although some of the composition will flow therefrom into the formation this process is slow, especially in formations having low permeability. The introduction of an over-flush composition, however, creates pressure that forces the treatment composition into the formation where there is more formation surface available for the scale inhibitor to interact with. A significant amount of the over-flush composition is therefore located in the wellbore and the near wellbore region, rather then in the formation itself.

Since the purpose of the over-flush is to displace treatment composition into the formation, a brine is typically used. Brine is readily available in large volumes and is cheap. It has now been discovered, however, that the presence of an ionic polymer such as a polyquaternary amine or a polyamino acid in the over-flush composition can significantly improve the retention of scale inhibitor in the formation and therefore extend the squeeze lifetime. This finding is surprising since the over-flush composition is conventionally only used to push the treatment composition comprising scale inhibitor further into a formation. It is hypothesised that the provision of an ionic polymer in the over-flush improves the retention of scale inhibitor in at least two ways. First the provision of an ionic polymer in the over-flush coats the wellbore and near wellbore region with polymer and that this interacts with scale inhibitor that would otherwise be returned in the production water. Second the ionic polymer, especially if it is a polyquaternary amine, is attracted to the formation surface where it displaces residual oil adhered thereto and in so doing creates additional surface area to which scale inhibitor can adhere.

In the methods of the present invention the over-flush is carried out with an ionic polymer (e.g. a polyquaternary amine or a polyamino acid). Preferred ionic polymers for use in the methods of the invention have a molecular weight of at least 250. Particularly preferred ionic polymers for use in the methods of the invention have a molecular weight of 500 to 10,000,000, preferably a molecular weight of 5,000 to 5,000,000, more preferably a molecular weight of 55,000-2,000,000, still more preferably a molecular weight of 100,000-1,500,000, yet more preferably a molecular weight of 500,000-1,000,000, e.g. a molecular weight of 800,000-900,000.

The term "molecular weight" is used herein in relation to ionic polymers to refer to their number average molecular weight as determined by, for example, gel permeation chromatography.

The term "ionic polymer" is used herein to encompass polymers that are charged in the conditions that prevail in the formation being treated. The polymer may carry groups that are charged or may carry groups that can become charged, e.g. by protonation or deprotonation. The ionic polymer may be cationic or anionic.

Representative examples of cationic polymers that may be used in the methods of the invention include polyquaternary amines (e.g. prepared from DMEAMA and 3-allyloxy-2-hydroxypropyltrimethylammonium chloride), polyamino acids (e.g. polyarginine, polyhistidine, polylysine), cationic polysaccahrides, quaternary polyalkyleneimines, quaternary polyalkanolamines, polyvinyl ammonium chloride, polyvinylimidazoline acid salts and condensed tannins, polydimethylamine-co-epichlorohydrin and biguanides, zwitterionic betaines and imidazolines and quaternary ammonium salts. Other cationic polymers include copolymers of vinyl monomers having cationic protonated amine or quaternary ammonium functionalities with, e.g. monomers such as acrylamide, methacrylamide, alkyl and dialkyl acrylamides, alkyl and dialkyl methacrylamides, alkyl acrylate, alkyl methacrylate, vinyl caprolactone or vinyl pyrrolidone. The vinyl monomers having cationic protonated amine or quaternary ammonium functionalities may be, for example, substituted with dialkylaminoalkyl acrylate, dialkylaminoalkyl methacrylate, monoalkylaminoalkyl acrylate, monoalkylamino alkyl methacrylate, trialkyl methacryloxyalkyl ammonium salt, trialkyl acryloxyalkyl ammonium salt, diallyl quaternary ammonium salts, and vinyl quaternary ammonium monomers having cyclic cationic nitrogen-containing rings such as pyridinium, imidazolium, and quaternized pyrrolidone, e.g., alkyl vinyl imidazolium, alkyl vinyl pyridinium, alkyl vinyl pyrrolidone salts. Suitable amine-substituted vinyl monomers for use herein include dialkylaminoalkyl acrylate, dialkylaminoalkyl methacrylate, dialkylaminoalkyl acrylamide, and dialkylaminoalkyl methacrylamide.

Polyquaternary amines and polyamino acids are particularly preferred.

Representative examples of anionic polymers that may be used in the methods of the invention include polyamino acids (e.g. polyaspartate and polyglutanic acid). Polyaspartate is particularly preferred.

In the methods of the present invention the over-flush is preferably carried out with a polyquaternary amine or a polyamino acid (e.g. polyaspartate). Polyquaternary amines are particularly preferred. One advantage of polyquaternary amines is that they function as de-oilers of the formation, i.e. they displace oil from the rock surface. As a result, the surface area of formation that is available for interaction with scale inhibitor is increased.

Preferred polyquaternary amines for use in the methods of the invention are those formed from monomers of formula (I):

wherein
each of $R^1$, $R^2$ and $R^3$ is independently hydrogen or an optionally substituted organic radical having from 2 to 20 carbon atoms, preferably 3 to 12 carbon atoms, e.g. 3 to 6 carbon atoms;
$R^4$ is an optionally substituted organic radical having from 1 to 20 carbon atoms, preferably 1 to 12 carbon atoms, e.g. 1 to 6 carbon atoms; and
X is a counterion which may optionally be covalently bonded to either $R^1$, $R^2$ or $R^3$.

Preferred monomers of formula (I) are those wherein $R^3$ is an aliphatic or aromatic radical, especially an aliphatic radical. Particularly preferably $R^3$ is a $C_{2-12}$ aliphatic radical. Particularly preferably $R^3$ is an alkylene radical.

Further preferred monomers of formula (I) are those wherein $R^4$ is an aliphatic or aromatic radical, especially an aliphatic radical. Particularly preferably $R^4$ is a $C_{2-12}$ aliphatic radical. Particularly preferably $R^4$ is an alkylene radical.

$R^3$ and $R^4$ may be the same or different, but are preferably the same.

Further preferred monomers of formula (I) are those wherein $R^1$ and $R^2$ are hydrogen.

Further preferred monomers of formula (I) are those wherein X is sulfate, phosphate or a halide, especially chloride.

The phrase "polyquaternary amine formed from monomers of formula (I)" is used herein to denote polyquaternary amines consisting essentially of monomers of formula (I). Typical polyquaternary amines for use in the invention will comprise at least 90%, preferably at least 95%, still more preferably at least 99% by weight of monomers of formula (I).

Polyquaternary amines for use in the invention may comprise one or more (e.g. 2 or 3, preferably 2) different monomers of formula (I). Preferably, however, the polyquaternary amines consist of one monomer of formula (I) (i.e. preferred polyquaternary amines are homopolymers).

Particularly preferred polyquaternary amines for use in the methods of the invention are formed from diallyl ammonium salts.

Diallyl ammonium salts suitable for use in the present invention include compounds of formula (II):

(II)

(wherein
$R^5$ and $R^6$ are each independently hydrogen or optionally substituted organic radicals having from 1 to 20 carbon atoms, preferably 1 to 12 carbon atoms, e.g. 1 to 6 carbon atoms; each R is independently selected from hydrogen and organic radicals having from 1 to 20 carbon atoms, e.g. 1 to 6 carbon atoms; and

Z is a counterion which may optionally be covalently bonded to either $R^5$ or $R^6$).

Preferred monomers of formula (II) are those wherein each R is a hydrogen atom or a substituted or unsubstituted, preferably unsubstituted, alkyl, alkenyl or aryl group. Particularly preferably, each R is a hydrogen atom or an alkyl group (e.g. methyl or ethyl). Although each R may be different, in preferred monomers of formula (II) each R is the same. Still more preferably, each R is a hydrogen atom.

In formula (II), Z is preferably sulfate, phosphate or a halide, especially chloride.

In particularly preferred monomers of formula (II), Z is not covalently bonded to either $R^5$ or $R^6$ (i.e. it stands as a separate or free counterion). In these monomers, $R^5$ and $R^6$ are each independently a substituted or unsubstituted, preferably unsubstituted, alkyl, alkenyl or aryl group. Particularly preferably, $R^5$ and $R^6$ are each independently an alkyl group, especially an unsubstituted alkyl group. Preferred alkyl groups have from 1 to 8 carbon atoms, e.g. $C_{1-6}$. Representative examples of preferred alkyl groups include methyl, ethyl, propyl, butyl and pentyl. Methyl is particularly preferred. Although $R^5$ and $R^6$ may be different, in preferred monomers of formula (I), $R^5$ and $R^6$ are the same (e.g. $R^5$ and $R^6$ are both methyl).

In formula (II), Z may be covalently linked either to $R^5$ or $R^6$. The structure of a monomer of this type in which Z is linked to $R^6$ is shown below in formula (IIa):

(IIa)

(wherein
R, $R^5$, $R^6$ and Z are as hereinbefore defined).

In those monomers where Z is covalently bonded to $R^5$ or $R^6$ (e.g. in monomers of formula (IIa)), the $R^5/R^6$ group to which it is bound is preferably an unsubstituted, alkyl, alkenyl or aryl group. Particularly preferably, the $R^5/R^6$ group to which Z is bound is an alkyl group (e.g. a $C_{1-8}$ alkyl group, more preferably a $C_{1-4}$ alkyl group). Ethyl ($-CH_2CH_2-$) is particularly preferred. The remaining $R^5/R^6$ group (i.e. $R^6$ when Z is bound to $R^5$ and vice versa) is preferably as defined above for $R^5$ and $R^6$ when Z is not covalently bound to the monomer structure.

Polyquaternary amines for use in the invention may comprise one or more (e.g. 2 or 3, preferably 2) different monomers of formula (II). Preferably, however, the polyquaternary amines consist of one monomer of formula (II) (i.e. preferred polyquaternary amines are homopolymers).

Particularly preferred polyquaternary amines for use in the invention are formed from diallyldimethyl ammonium chloride (DADMAC). DADMAC is commercially available from Chengdu Cation Chemistry Company, China. A homopolymer of DADMAC is still further preferred.

Preferably the polyquaternary amines for use in the present invention are substantially linear. For example, it is preferred that less than 10%, more preferably less than 5% cross linking is present. Still more preferably the polyquaternary amines for use in the present invention are water-soluble. Oil soluble polyquaternary amines may, however, also be used.

Suitable ionic polymers (e.g. polyamino acids and polyquaternary amines) for use in the present invention are commercially available. Alternatively the ionic polymers for use in the invention may be prepared by any conventional polymerisation procedure known in the art (e.g. bulk polymerisation, solution polymerisation or suspension polymerisation). Solution polymerisation is preferred. Those skilled in the art will be aware of suitable reaction conditions as well as appropriate catalysts, polymerisation initiators and chain transfer agents. Preferred polyquaternary amines for use in the invention include those obtainable by polymerisation (e.g. by solution polymerisation) of at least one monomer of formula (I) or (II).

Preferred polyquaternary amines for use in the invention comprise repeating units represented by formula (III) and/or formula (IV):

(III)

(wherein
R, $R^5$, $R^6$ and Z are as hereinbefore defined; and
m is an integer from 400 to 8000, preferably 800 to 4000, more preferably 1500 to 2500).

The polymerisation reaction to produce polyquaternary amines represented by formulae (III) and (IV) may involve an intramolecular-intermolecular mechanism sometimes called cyclopolymerisation. In this mechanism a 5- or 6-membered ring may be formed from the monomer of formula (II) in the polymerisaton reaction (by an intramolecular reaction). The ring then reacts with a further monomer in an intermolecular reaction to extend the length of the polymer chain. Further intramolecular and intermolecular reactions may then occur.

During the intramolecular reaction step of the polymerisation, the new bond may be formed between the terminal carbon atom of one allyl group (i.e. at =N—$CR_2$—CR=$CR_2$) and the central carbon atom of the second allyl group (i.e. at =N—$CR_2$—CR=$CR_2$). This reaction yields a 6-membered ring (i.e. forms a repeat unit of formula (IV)). Alternatively, the new bond may be formed between the central carbons atom of both allyl groups. This reaction yields a 5-membered ring (i.e. forms a repeat unit of formula (III)).

Preferred polyquaternary amines for use in the invention may comprise any ratio of repeat units of formulae (III) and (IV). For instance, the ratio of (III):(IV) may be in the range 99:1 to 1:99. More preferably the ratio of (III):(IV) is in the range 98:2 to 50:50, e.g. at least 95:5. Still more preferably the polyquaternary amine for use in the invention is substantially free from repeat units of formula (IV) (e.g. the polyquaternary amine comprises less than 2% wt repeating units of formula (IV)). Polyquaternary amines which consist essentially of the repeat units shown in formula (III) are particularly preferred.

Preferred polyquaternary amines, e.g. of formulae (III) and (IV), for use in the invention are also those with one or more inorganic end groups. By an "end group" is meant a non-monomeric group which is located at an end of the polymer chain and is covalently attached to the monomer adjacent thereto. Representative examples of preferred inorganic end groups include —$SO_4H$, —$SO_3H$, —$H_2PO_3$, —$H_2PO_4$ and salts thereof. Further preferred end groups include anionic derivatives of the afore-mentioned groups (e.g. —$SO_4^-$, —$SO_3^-$—$HPO_3^-$ and —$HPO_4$). Such end groups may be provided by use of appropriate chain transfer agents and/or initiators during polymerisation. Polyquaternary amines for use in the invention may have one or more (e.g. 1 or 2) end groups.

The polymerisation to produce polyquaternary amines of formulae (III) or (IV) is preferably carried out in solution. Still more preferably the polymerisation is carried out in water. The pH of the polymerisation medium is preferably 4 to 7, still more preferably 5 to 6.5. If necessary the pH of the medium can be adjusted by addition of a neutralising solution (e.g. NaOH (aq.)).

An initiator will typically be used to start polymerisation. Any water soluble initiator can be employed for this purpose, e.g. hydrogen peroxide, dialkyl peroxides, persulfates and azo compounds. Sodium persulfate is a preferred initiator. Initiators are generally used in an amount of 0.1-10% wt of the total weight of monomers, more preferably 0.5-5% wt of the total weight of monomers, e.g. about 1-2% wt of the total weight of monomers.

In a preferred polymerisation method to produce polyquaternary amines of formulae (III) or (IV), a chain transfer agent is also used. Any conventional chain transfer agent may be utilised although hypophosphorus acid and salts thereof are preferred. Hypophosphorus acid and salts thereof may advantageously provide polymers having end groups as hereinbefore defined. Chain transfer agents are typically used in an amount of 1-20% wt of the total weight of monomers, more preferably 2-10% wt of the total weight of monomers.

The polymerisation reaction will typically be carried out at a temperature of 60 to 120° C., preferably 80 to 110° C., e.g. about 100° C. Generally polymerisation occurs for 1 to 4 hours, e.g. about 2 to 3 hours.

Thus, in a typical polymerisation method, monomers (e.g. DADMAC) are dissolved in water and heated to 60-100° C. Initiator and chain transfer agent, both dissolved in water, are added and the temperature is increased until reflux occurs. Generally polymerisation will occur for about 2 hours. The polyquaternary amine may then be isolated by conventional techniques.

The ionic polymer (e.g. polyquaternary amine or polyamino acid) used in the methods of the invention is preferably present in a liquid carrier. Thus the composition used to carry out the over-flush step (i.e. the over-flush composition) preferably comprises an ionic polymer (e.g. a polyquaternary amine) as hereinbefore described and a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Other suitable non-aqueous carriers are diesel and base oil (mineral oil). Still more preferably the liquid carrier is aqueous (e.g. sea water). When the liquid carrier is aqueous, it is preferred that the solution or dispersion of ionic polymer in carrier liquid has a pH less than 10. Preferably the pH of the solution/dispersion is 1 to 7, more preferably 3 to 6, e.g. about 4 to 6. Particularly preferably the pH of the solution/dispersion is about 1 to 5, e.g. 2 to 4 or about 3.

The concentration of the ionic polymer (e.g. polyquaternary amine or polyamino acid) in the over-flush composition will be an amount effective to increase the retention of scale inhibitor to the formation. Typically, however, the ionic polymer will be present in the composition at a concentration of 0.05 to 50% wt, preferably 0.1 to 30% wt, more preferably 1 to 20% wt, e.g. about 5 to 10% wt.

In preferred methods of the invention, the over-flush step further comprises flushing the system with an aqueous fluid. Thus in particularly preferred methods the over-flush step comprises:
(iiia) over-flushing said system with an ionic polymer (e.g. a polyquaternary amine or a polyamino acid); and
(iiib) over-flushing said system with an aqueous fluid.

The over-flush step for use in the method of the invention may additionally comprise introducing a scale inhibitor into the hydrocarbon producing system. Preferred scale inhibitors are those described below in relation to the treatment step. The over-flush and treatment step may use the same or different scale inhibitor.

The scale inhibitor for use in the over-flush step is preferably applied as a solution or dispersion (e.g. a solution) in a liquid carrier. The scale inhibitor may be present in the same composition as the ionic polymer, in the aqueous fluid or in a separate composition. A preferred over-flush composition comprises an ionic polymer (e.g. a polyquaternary amine or a polyamino acid), a scale inhibitor and a liquid carrier.

The concentration of the scale inhibitor in the over-flush composition (total of all of over-flush) is typically 10-5000 ppm, more preferably 50-1000 ppm. The concentration of the scale inhibitor in the over-flush composition is generally much lower than the concentration of the scale-inhibitor in the treatment composition.

The over-flush composition may also contain other additives known in the art for use in well treatment. Such additives include surfactants, thickeners, diversion agents, corrosion inhibitors, pH buffers and catalysts. Preferably the over-flush composition consists essentially of (e.g. consists of) an ionic polymer (e.g. a polyquaternary amine or a polyamino acid) as hereinbefore defined, a liquid carrier and optionally a scale inhibitor.

The amount of over-flush composition used in the method of the present invention will vary widely depending on factors such as the nature of the ionic polymer (e.g. polyquaternary amine or a polyamino acid), the nature of the scale inhibitor present in the formation, the nature of the formation (e.g. the levels of Ba, Sr and Ca present) and so on. Typically, however, an ionic polymer (e.g. a polyquaternary amine or a polyamino acid) may be employed with a 10% treatment solution in an amount in the range of from 0.01 to 5 tons per $m^3$ of formation to be treated, more preferably from 0.01 to 0.03 tons per $m^3$.

In preferred methods of the invention, over-flushing is the final step prior to a shut in period.

Pre-Flush Step

The pre-flush step of the methods of the invention preferably comprises injecting a fluid into the hydrocarbon producing system. Thus the composition used to carry out the pre-flush (i.e. the pre-flush composition) preferably comprises a carrier fluid. The fluid may be aqueous or non-aqueous. Suitable non-aqueous carriers include alkanols, particularly methanol or polyols (e.g. a glycol). Particularly preferred glycols include those of the formula $(CH_2)_n(OH)_2$ wherein n is 2 to 6 (e.g. ethylene glycol). Other suitable non-aqueous carriers include aldehydes, diesel, base oil (mineral oil), kerosene, heavy aromatic naptha and petroleum distillates. Alternatively the liquid carrier may be aqueous (e.g. sea water). Non-aqueous carriers are preferably used if the formation is water-sensitive and/or it is a low pressure reservoir. Otherwise, an aqueous carrier is generally preferred.

As mentioned above, a preferred pre-flush step for use in the method of the present invention additionally comprises introducing an ionic polymer (e.g. a polyquaternary amine or a polyamino acid) into the hydrocarbon producing system. The pre-flush therefore preferably comprise pre-flushing said system with an ionic polymer in a carrier fluid. Optionally a pre-flush with an aqueous or non-aqueous fluid may also be carried out.

Preferred ionic polymers (e.g. polyquaternary amines or polyamino acids) are those described above in relation to the over-flush step. The pre-flush step and the over-flush step may use the same or different ionic polymer. Preferably, however, the pre-flush and over-flush steps use the same ionic polymer.

The ionic polymer (e.g. polyquaternary amine or polyamino acid) for use in the pre-flush step is preferably applied as a solution or dispersion (e.g. a solution) in a liquid carrier. Thus the pre-flush composition preferably comprises an ionic polymer (e.g. a polyquaternary amine or a polyamino acid) and a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water). When the liquid carrier is aqueous, it is preferred that the solution or dispersion of ionic polymer in carrier liquid has a pH less than 10. Preferably the pH of the solution/dispersion is 1 to 7, more preferably 3 to 6, e.g. about 4 to 6. Particularly preferably the pH of the solution/dispersion is about 1 to 5, e.g. 2 to 4 or about 3.

The concentration of the ionic polymer (e.g. polyquaternary amine or polyamino acid) in the pre-flush composition will be an amount effective to increase scale inhibitor retention and will be readily determined by those skilled in the art. Typically, however, the ionic polymer (e.g. polyquaternary amine or polyamino acid) will be present in the liquid carrier at a concentration of 0.01 to 30% wt, preferably 1 to 10% wt, more preferably 5 to 10% wt, e.g. about 5 to 7% wt.

The pre-flush step for use in the method of the invention may additionally comprise introducing a scale inhibitor into the hydrocarbon producing system. Preferred scale inhibitors are those described below in relation to the treatment step. The pre-flush and treatment step may use the same or different scale inhibitor.

The scale inhibitor for use in the pre-flush step is preferably applied as a solution or dispersion (e.g. a solution) in a liquid carrier. The scale inhibitor may be present in the same composition as the ionic polymer (e.g. polyquaternary amine or polyamino acid) or in a separate composition. A preferred pre-flush composition comprises an ionic polymer (e.g. a polyquaternary amine or polyamino acid), a scale inhibitor and a liquid carrier.

The concentration of the scale inhibitor in the pre-flush composition (total of all of pre-flush) is typically 10-5000 ppm, more preferably 50-1000 ppm. The concentration of the scale inhibitor in the pre-flush composition is generally much lower than the concentration of the scale-inhibitor in the treatment composition.

The pre-flush composition(s) may additionally comprise a surfactant and/or a demulsifier. The concentration of surfactant in the pre-flush composition (total of all of pre-flush) is typically 10-5000 ppm, more preferably 50-1000 ppm. Similarly the concentration of demulsifier in the pre-flush composition (total of all of pre-flush) is typically 10-5000 ppm, more preferably 50-1000 ppm.

In preferred methods of the invention, the pre-flush step further comprises flushing the system with an aqueous fluid. Thus in particularly preferred methods the pre-flush step comprises:

(ia) pre-flushing said system with an aqueous fluid; and
(ib) pre-flushing said system with ionic polymer (e.g. polyquaternary amine).

In such a step a scale inhibitor may optionally be present in step (ia) and/or step (ib). Preferably a scale inhibitor is present in step (ib).

The amount of pre-flush composition used in the method of the present invention will vary widely depending on factors such as the nature of the scale inhibitor to be used, the nature of the formation (e.g. the levels of oil present) and so on. The appropriate amount of pre-flush composition will be readily determined by those skilled in the art. Typically, however, a pre-flush composition will be used in an amount in the range of from 0.01 to 10 tons per m³ of formation to be treated, more preferably from 0.01 to 0.06 tons per m³.

Treatment Step

In the methods of the present invention, a scale inhibitor is introduced into the formation in the treatment step. In preferred treatments, an ionic polymer such as a polyquaternary amine (e.g. a polymer formed from a diallyl ammonium salt) or a polyamino acid (e.g. polyaspartate) as hereinbefore described is introduced into the formation. Thus a preferred method of the present invention comprises the steps of:

(i) pre-flushing said system with a liquid;
(ii) treating said system with an ionic polymer and a scale inhibitor; and
(iii) over-flushing said system with an ionic polymer.

The method of the invention may employ any conventional scale inhibitor. As used herein, the term "scale inhibitor" means any substance that inhibits or prevents the deposition of scale within a hydrocarbon producing system. Scale inhibitors are well known to those skilled in the art and include, for example, phosphonates, phosphate esters and polymers comprising phosphonate, sulfate and carboxylate groups. Representative examples of specific scale inhibitors that may be used in the method of the present invention include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate) and 2-acrylamido-2-methyl-1-propanesulphonic acid (AMPS).

Preferably the scale inhibitor for use in the method of the invention comprises at least one anionic group, e.g. a carboxylate group or a phosphate group. By a carboxylate group is meant a group —COO⁻Y⁺ wherein Y is a counterion, preferably hydrogen or a metal atom (e.g. a group I or II metal atom). By a phosphate group is meant a group —P(O)(O⁻Y⁺)₃ wherein Y a counterion, preferably hydrogen or a metal atom (e.g. a group I or II metal atom).

Preferably the scale inhibitor for use in the method of the invention comprises at least one phophonate group or phosphonate ester group. Preferred scale inhibitors include phosphonates, phosphate esters and polymers comprising phosphonate or phosphonate ester groups.

Particularly preferred scale inhibitors for use in the invention are polymeric. Polymeric scale inhibitors may be made by any conventional polymerisation method or may be commercially available, e.g. from Champion Technologies Ltd. Still more preferably the scale inhibitors for use in the invention are polymeric and comprise at least one anionic group.

The scale inhibitor is preferably a polymer formed from an anionic monomer. By an "anionic monomer" is meant a monomer carrying a group capable of providing a negative charge on the resulting polymer chain. Preferred anionic monomers carry at least one carboxylate group or at least one phosphonate group, e.g. at least one phosphonate group.

Polymeric scale inhibitors for use in the present invention are preferably formed from monomers of formula (V):

(Va)

(Vb)

(wherein
R⁷ is —CO₂Y, —SO₃Y, —PO₃Y₂ or an alkyl or aryl group (e.g. a C₁₋₁₀ alkyl or aryl group) substituted with at least one (e.g. one) —CO₂Y, —SO₃Y or —PO₃Y₂ group in which Y is a hydrogen atom or a univalent metal atom;
R⁸, R⁹ and R¹⁰ are each independently hydrogen, an optionally substituted alkyl or aryl group having from 1 to 6 carbon atoms or a group R⁷ as hereinbefore defined.

In preferred monomers of formula (V), R⁷ is —CO₂Y, an alkyl group (e.g. C₁₋₃ alkyl) substituted with at least one (e.g. one) —CO₂Y group or an aryl group (e.g. a phenyl group) substituted with at least one (e.g. one) —CO₂Y group. In particularly preferred monomers R⁷ is —CO₂Y. In further preferred monomers of formula (V) the group Y is hydrogen or a group I or II metal atom (e.g. sodium or potassium).

Preferred monomers of formula (V) are also those wherein R⁸ is a hydrogen atom or a substituted or unsubstituted, preferably unsubstituted, alkyl group. Particularly preferably R⁸ is hydrogen or a C₁₋₃ alkyl group (e.g. methyl). Still more preferably R⁸ is hydrogen.

In further preferred monomers of formula (V), R⁹ and R¹⁰ are independently hydrogen, —CO₂Y, an alkyl group (e.g. C₁₋₃ alkyl) substituted with at least one (e.g. one) —CO₂Y group or an aryl group (e.g. a phenyl group) substituted with a —CO₂Y group wherein Z is as hereinbefore defined. Although R⁹ and R¹⁰ may be different, in preferred monomers of formula (V), R⁹ and R¹⁰ will be the same. Still more preferably R⁹ and R¹⁰ are both hydrogen atoms.

Preferred monomers are those of formula (Va).

Particularly preferred scale inhibitors for use in the present invention are polymers comprising an anionic monomer selected from acrylic acid, methacrylic acid, vinyl sulfonic acid, vinyl phosphonic acid, maleic anhydride, itaconic acid, crotonic acid, maleic acid, fumaric acid or styrene sulfonic acid. Especially preferred scale inhibitors are formed from anionic monomers selected from acrylic acid, methacrylic acid, maleic anhydride, itaconic acid, crotonic acid and maleic acid, especially acrylic acid. Such monomers are commercially available, e.g. from Aldrich Chemical Company Inc.

Especially preferred scale inhibitors for use in the present invention comprise a copolymer formed from a diallyl ammonium salt (e.g. dially dimethyl ammonium chloride) and at least one anionic monomer as hereinbefore described. Representative examples of scale inhibitors of this type are disclosed in WO2007/015090 to Champion Technologies Ltd and WO2007/080417 to Champion Technologies Ltd and Sichuan Sanyuan Chem Limited, Corporation.

Representative examples of commercially available scale inhibitors that are suitable for use in the method of the invention include GYPTRON® SA3050 scale inhibitor, GYPTRON® SA1820 scale inhibitor, GYPTRON® SA1400 scale inhibitor, GYPTRON® SA1470 scale inhibitor, GYPTRON® SA1110 scale inhibitor, GYPTRON® SA1460 scale inhibitor and GYPTRON® SA1910 scale inhibitor (all available from Champion Technologies Ltd).

The scale inhibitors for use in the invention are preferably applied as a solution or dispersion (e.g. a solution) in a liquid carrier. Thus the treatment composition preferably comprises a scale inhibitor and a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water).

When the liquid carrier is aqueous, it is preferred that the solution or dispersion of scale inhibitor in carrier liquid has a pH less than 10. Preferably the pH of scale inhibitor solution/dispersion is 1 to 6, more preferably 1 to 3, e.g. about 2 to 3.

The concentration of the scale inhibitor in the treatment composition will be an amount effective to inhibit scale formation and will be readily determined by those skilled in the art. Typically, however, the scale inhibitor will be present in the liquid carrier at a concentration of 0.05 to 50% wt, preferably 0.1 to 30% wt, more preferably 1 to 20% wt, e.g. about 5 to 10% wt.

The treatment composition may provide an inhibitor concentration in the fluids present in a hydrocarbon formation that is the minimum required to prevent inorganic scale formation (e.g. at least 1 ppm (by volume), more preferably at least 5 ppm (by volume) or 20 ppm (by volume)). Representative examples of inhibitor concentrations in the fluids of a formation are 1 to 10,000 ppm (by volume), more preferably 10 to 5000 ppm (by volume), still more preferably 20 to 1000 ppm (by volume, e.g. about 50 ppm (by volume). More preferably the carrier liquid provides an inhibitor concentration in the fluids of a formation of 1 to 50 ppm (by volume), still more preferably 1 to 10 ppm (by volume), e.g. about 5 ppm (by volume).

As mentioned above, a preferred treatment step for use in the method of the present invention additionally comprises introducing an ionic polymer (e.g. a polyquaternary amine or a polyamino acid) into the hydrocarbon producing system. Preferred ionic polymers (e.g. polyquaternary amines or polyamino acids) are those described above in relation to the over-flush step. The treatment step and the over-flush step may use the same or different ionic polymer. Preferably, however, the treatment and over-flush steps use the same ionic polymer.

The ionic polymer (e.g. polyquaternary amine or polyamino acid) for use in the treatment step is preferably applied as a solution or dispersion (e.g. a solution) in a liquid carrier. Thus the treatment composition preferably comprises an ionic polymer and a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water). When the liquid carrier is aqueous, it is preferred that the solution or dispersion of polyquaternary amine in carrier liquid has a pH less than 10. Preferably the pH of the solution/dispersion is 1 to 7, more preferably 3 to 6, e.g. about 4 to 6. Particularly preferably the pH of the solution/dispersion is about 1 to 5, e.g. 2 to 4 or about 3.

The concentration of the ionic polymer (e.g. polyquaternary amine or polyamino acid) in the treatment composition will be an amount effective to increase scale inhibitor retention and will be readily determined by those skilled in the art. Typically, however, the ionic polymer will be present in the liquid carrier at a concentration of 0.01 to 30% wt, preferably 1 to 10% wt, more preferably 5 to 10% wt, e.g. about 5 to 7% wt.

The ionic polymer (e.g. polyquaternary amine or polyamino acid) and the scale inhibitor for use in the treatment step are preferably formulated in separate liquid carriers. In this case, the ionic polymer may be injected before, during or after injection of the scale inhibitor. If the ionic polymer is injected after scale inhibitor then this must be carried out as a separate step to the over-flush comprising ionic polymer. Preferably, however, the hydrocarbon producing system is treated with the ionic polymer (e.g. polyquaternary amine or polyamino acid) in a first step and with said scale inhibitor in a second step. In this case, the ionic polymer may be shut in for a period of time to increase its adsoprtion to the formation prior to introduction of the scale inhibitor. Typical shut in times are 1 to 24 hours, more preferably 2 to 12 hours, e.g. about 4 hours.

A preferred method of the present invention therefor comprises the steps of:
(i) pre-flushing said system with a liquid;
(iia) treating said system with an ionic polymer;
(iib) treating said system with a scale inhibitor; and
(iii) over-flushing said system with an ionic polymer.

When the system is contacted with ionic polymer after scale inhibitor the method of the present invention comprises the steps of:
(i) pre-flushing said system with a liquid;
(iia) treating said system with a scale inhibitor;
(iib) treating said system with an ionic polymer; and
(iii) over-flushing said system with an ionic polymer.

In this case, steps (iib) and (iii) must be carried out separately. In other words, at least two injections of ionic polymer must be carried out.

Alternatively the ionic polymer and the scale inhibitor may be present together in the treatment composition. In this case, the compounds are injected simultaneously in the treatment step. This method has the advantage that it is simple and less time consuming.

Another preferred method of the present invention therefore comprises the steps of:
pre-flushing said system with a liquid;
(i) treating said system simultaneously with an ionic polymer and a scale inhibitor; and
(ii) over-flushing said system with an ionic polymer.

The amount of treatment composition(s) to be used to inhibit scale formation will vary widely depending on factors such as the nature of the ionic polymer used, the nature of the scale inhibitor, the nature of the formation (e.g. the levels of Ba, Sr and Ca present) and so on. The appropriate amount of ionic polymer will be readily determined by those skilled in the art. Typically, however, an ionic polymer may be employed with a 10% treatment solution in an amount in the range of from 0.01 to 5 tons per $m^3$ of formation to be treated, more preferably from 0.01 to 0.03 tons per $m^3$. Similarly the appropriate amount of scale inhibitor will be readily determined by those skilled in the art. Typically, however, a scale inhibitor may be employed with a 10% treatment solution in an amount in the range of from 0.01 to 5 tons per $m^3$ of formation to be treated, more preferably from 0.02 to 0.01 tons per $m^3$.

The treatment compositions may also contain other additives known in the art for use in well treatment. Such additives include surfactants, thickeners, diversion agents, corrosion inhibitors, pH buffers and catalysts. Preferably the treatment composition consists essentially of a scale inhibitor, an ionic polymer (e.g. a polyquaternary amine or a polyamino acid) as hereinbefore defined and a liquid carrier.

Shut In

Preferred methods of the invention comprise a shut in period. The time of shut in depends on a number of factors, including the nature of the formation, the nature and amount of the ionic polymer and the nature and amount of scale inhibitor. Typically, however, the shut in will last for 1 to 48 hours, preferably 6 to 24 hours, more preferably 8 to 18 hours, e.g. about 10 to 14 hours or about 12 hours.

The method of the present invention may be applied to a hydrocarbon producing system at any stage, e.g. before and/or after hydrocarbon production. The method of the invention may also be repeated as many times as necessary.

Treatment according to the method of the present invention may be conducted according to any techniques conventional in the art and any convenient equipment may be used to supply the pre-flush, treatment and over-flush compositions to the hydrocarbon producing system. For instance, bull heading or coil tubing may be used. Thus the pre-flush, treatment and over-flush compositions may be introduced into a well bore by, for example, injection under pressures sufficient to penetrate the formation and the equipment present therein.

Treatment times will depend on a number of factors including the nature of the ionic polymer used, the nature of the formation and the level of scaling which would otherwise occur. Suitable times will be readily determined by those skilled in the art.

An advantage of the methods of the invention is that the scale inhibiting treatment is effective for a longer period of time than an equivalent treatment carried out with the same amount of scale inhibitor but lacking ionic polymer (e.g. polyquaternary amine or polyamino acid) in the over-flush. Preferably the methods of the invention increase the squeeze treatment lifetime (e.g. as determined by the method set forth in the following examples) by at least 120%, still more preferably at least 150%, yet more preferably at least 175%. In some cases the methods of the invention may increase the squeeze treatment lifetime (e.g. as determined by the method set forth in the following examples) by as much as 200 or 300%. This represents a major benefit since it means less chemicals are wasted and even more significantly it means that the well needs to be turned off production fewer times.

Without wishing to be bound by theory, it is hypothesised that the method of the present invention is able to further extend the squeeze lifetime of scale inhibitors, even when an ionic polymer is applied during the pre-flush and/or treatment steps, by coating the wellbore and near wellbore region with ionic polymer (e.g. polyquaternary amine). It is thought that this coated surface can then interact with scale inhibitor that is released from within the formation during production, i.e. it catches or traps scale inhibitor that otherwise would be produced back from the well. As a result, the overall amount of scale inhibitor that is retained in the formation at any given time is greater compared to the corresponding method wherein a brine over-flush lacking, e.g. polyquaternary amine, is used. Correspondingly the rate at which scale inhibitor is produced from a well is lower compared to the comparative method wherein a brine over-flush lacking ionic polymer is used. The residual scale inhibitor return curve is therefore closer to ideal.

The invention will now be described with reference to the following non-limiting examples.

EXAMPLES

Chemicals

The scale inhibitor used is GYPTRON® SA3050, commercially available from Champion Technologies Ltd. It is a polyacrylate scale inhibitor that comprises amine groups.

The ionic polymer present in the pre flush and in the case of treatments 2 the over-flush, is a polyquaternary amine, specifically Gyptron SA1810. It is commercially available from Champion Technologies Ltd. It is a homopolymer of DADMAC having a molecular weight of about 50,000.

Four field trials on two wells (wells A and B) were carried out in a field in the North Sea. Each well underwent two treatments—one with a polyquaternary amine according to the method of the present invention in the over-flush and one lacking such a polymer in the over-flush. Otherwise the treatments were identical. A comparison of the squeeze life times for each treatment in each well was made.

Field Treatment Designs

The inhibitor squeeze treatments were carried out based on the protocol set out below:

Well A

Treatment 1

Figure 1:
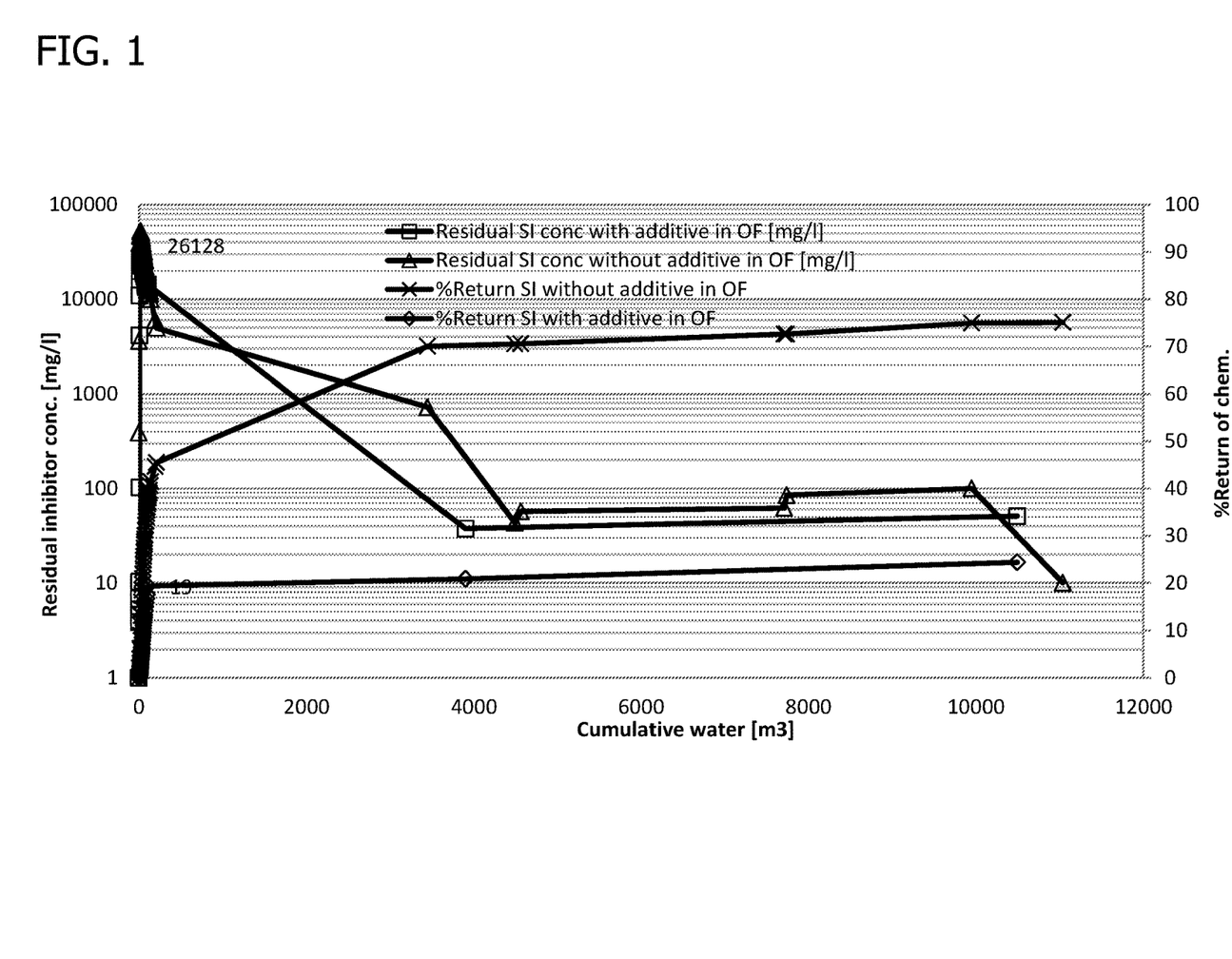
FIG. 1 shows the scale inhibitor return curves and mass balance curves for each of treatments 1 and 2 (without and with polyquaternary amine according to the invention respectively) in well A.

I. Pre-flush: 10 m$^3$ 3% KCl
ii. Main pill 1: 30 m$^3$-10% polyquaternary amine (GYPTRON® SA1810 scale inhibitor)
iii. Main pill 2: 85 m$^3$-10% Scale Inhibitor (GYPTRON® SA3050 scale inhibitor)
iv. Over-flush: 30 m$^3$ brine
v. Shut in: 16 hours Treatment 2 was identical to treatment 1 except that step iv comprised:

Over-flush: 10 m$^3$-10% polyquaternary amine (GYPTRON® SA1810 scale inhibitor)+40 m$^3$ brine The results are shown in FIG. 1 wherein SI=scale inhibitor, OF=over-flush and additive=polyquaternary amine.

FIG. 1 shows the residual scale inhibitor return curves (i.e. the amount of scale inhibitor produced from the well over time) for treatments 1 and 2 without and with the polyquaternary amine added in the over flush fluid respectively for well A. Ideally this curve is shallow indicating that a relatively small amount of scale inhibitor (e.g. just more than the MIC for that inhibitor) is consistently leached into the system so that effective inhibition is provided over a long period of time. The mass balance curves (labelled % return scale inhibitor) from both treatments are also displayed in FIG. 1. Ideally this curve increases slowly because once it approaches 100% there is no scale inhibitor left in the well and another treatment with inhibitor will need to be carried out.

From FIG. 1 it can be seen that in treatment 2, including the addition of polydadmac in the over-flush, less inhibitor is released in the initial spike when the well is first put back on production after shut in which leaves more inhibitor for release over a longer period. This is corroborated by the fact that by ~11000 m$^3$ of produced water the scale inhibitor concentration in the produced water had dropped to 10 ppm for the treatment without additive added in over-flush. In comparison the inhibitor concentration is still well above 35 ppm at the same produced water volume for the treatment with the additive present in the over-flush.

These results are also confirmed by the mass balance results. For treatment 1 without the polyquaternary amine in the over-flush, a high percentage of the scale inhibitor is released after ~11,000 m³ of produced water volume and only ~25% of the scale inhibitor is left in the reservoir to use. However, at the same produced water volume, much more scale inhibitor is still retained in the reservoir for the treatment when the polyquaternary amine is present in the over flush. Only about 25% scale inhibitor is released based on the mass balance curves, i.e. about 75% of the scale inhibitor is still retained in the well. This gives rise to a much longer inhibitor release, indicating a longer inhibitor squeeze life.

Well B
Treatment 1
i. Pre-flush: 15 m³ 3% KCl
ii. Main pill 1: 27 m³-10% polyquaternary amine (GYPTRON® SA1810 scale inhibitor)
iii. Main pill 2: 80.5 m³-10% Scale Inhibitor (GYPTRON® SA3050 scale inhibitor)
iv. Over-flush: 30.5 m³ brine
v. Shut in: 19 hours
Treatment 2
Treatment 2 was identical to treatment 1 except that step iv comprised:
iv. Over-flush: 10 m³-10% polyquaternary amine (GYPTRON® SA1810 scale inhibitor)+40 m³ brine The results are shown in FIG. 2 wherein SI=scale inhibitor, OF=over-flush and additive=polyquaternary amine.

Figure 2:
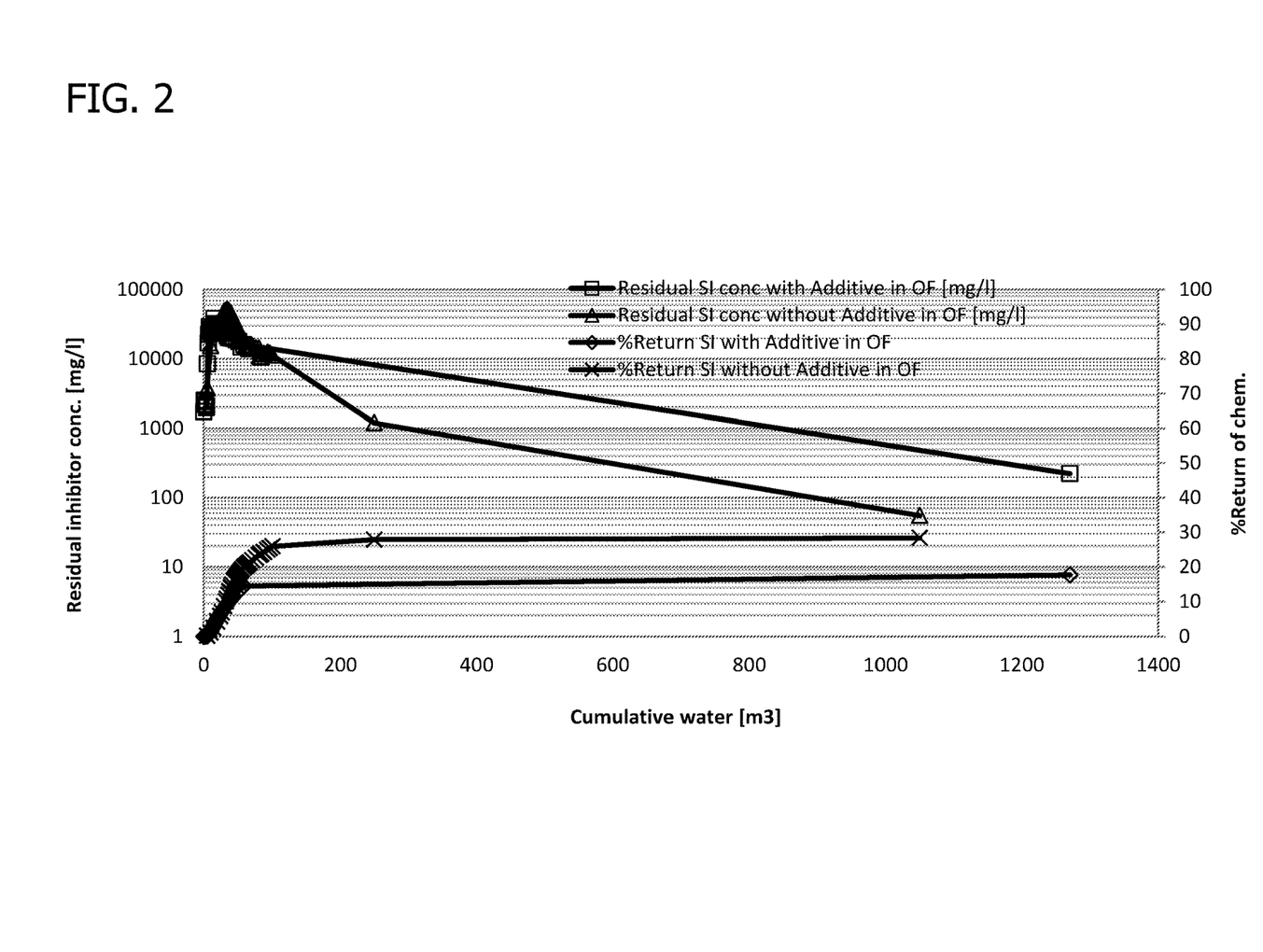
FIG. 2 shows the scale inhibitor return curves and mass balance curves for each of treatments 1 and 2 (without and with polyquaternary amine according to the invention respectively) in well B.

FIG. 2 shows the residual inhibitor return curves for treatments 1 and 2 without and with the polyquaternary amine added in the over flush fluid for Well B. The mass balance curves from both treatments are also displayed in FIG. 2.

FIG. 2 clearly shows that the treatment without polyquaternary amine in the over-flush results in less inhibitor being retained in the reservoir and more inhibitor being quickly released than that from the treatment with the polyquaternary amine added in the over-flush. At the same produced water volume at ~1100 m³, nearly 40% of the scale inhibitor has returned (i.e. been released) when the polyquaternary amine is absent from the over-flush. In contrast when the polyquaternary amine is present in the over-flush only about 18% of the scale inhibitor has been released from the reservoir (i.e. over 80% of the scale inhibitor remains present in the well).

Additionally when the inhibitor is used without polyquaternary amine in the over-flush, the amount of inhibitor in the produced water when the well is put back on production is spiked higher than the corresponding initial return curves for the treatment with polyquaternary amine added in the over-flush volume. Correspondingly the level of inhibitor returned thereafter is consistently lower in the treatment without polyquaternary amine in the over-flush. As with the results for Well A this indicates that the presence of polyquaternary amine in the over-flush gives rise to a longer squeeze lifetime.

The results show that scale inhibitor treatment life can be significantly extended if poly(dadmac) is added to the over-flush composition. A total of four treatments were carried out in two separate wells. In each well, both treatments were carried out with the poly(dadamac) additionally present in the pre-flush. However, polydadamac was further added in the over-flush in one treatment but not for the other treatment. A clear comparison was made for both wells for the treatments with and without the poly(dadmac) present in the over-flush fluid. The conclusions can be drawn as follows:

i. A treatment comprising poly(dadmac) in the over flush can retain significantly more scale inhibitor in the reservoir than a comparative treatment lacking poly(dadmac) in the over-flush fluid at the same produced water volume.

ii. An inhibitor treatment life can be extended with the poly(dadmac) present in the over-flush fluid.

What is claimed is:

1. A method for increasing the retention of a scale inhibitor within a hydrocarbon producing system, the method comprising:
   (i) pre-flushing the system with a liquid;
   (ii) treating the system with a scale inhibitor after step (i), the scale inhibitor comprising a scale inhibitor other than a polyamino acid; and
   (iii) over-flushing the system with a composition comprising an ionic polymer and an aqueous carrier after step (ii), wherein the concentration of the ionic polymer in the composition is 5 to 50 wt %, the pH of the composition is 4 to 6, the composition is a solution or dispersion, and the ionic polymer present in the over-flush comprises a polyamino acid.

2. The method as claimed in claim 1, wherein the pre-flushing and/or the treating step further comprises contacting the system with the ionic polymer.

3. The method as claimed in claim 1, wherein the pre-flushing step comprises contacting system with the ionic polymer.

4. The method as claimed in claim 1, wherein the treating step further comprises treating the system with the ionic polymer.

5. The method as claimed in claim 1, wherein the method further comprises treating the system with the ionic polymer after the pre-flushing step and before the treating step.

6. The method as claimed in claim 1, wherein the treating step comprises simultaneously treating the system with the ionic polymer and the scale inhibitor.

7. The method as claimed in claim 1, wherein the over-flushing step further comprises over-flushing the system with an aqueous fluid after over-flushing the system with the composition.

8. The method as claimed in claim 1, wherein the over-flushing step is the final step prior to a shut in period.

9. The method as claimed in claim 1, wherein the scale inhibitor comprises at least one anionic group, the anionic group comprising a carboxylate group or a phosphonate group.

10. The method as claimed in claim 1, wherein the scale inhibitor comprises a phosphonate, phosphate ester or a polymer comprising phosphonate or phosphonate ester groups.

11. The method as claimed in claim 1, further comprising placing the system back on production after the over-flushing step.

12. The method as claimed in claim 1, wherein the polyamino acid present in the over-flush comprises a polyaspartate.

* * * * *

UNITED STATES PATENT AND TRADEMARK OFFICE
CERTIFICATE OF CORRECTION

PATENT NO. : 10,072,203 B2
APPLICATION NO. : 15/191201
DATED : September 11, 2018
INVENTOR(S) : Chen et al.

Page 1 of 1

It is certified that error appears in the above-identified patent and that said Letters Patent is hereby corrected as shown below:

On the Title Page

Item (72), Inventors: "Stqavanger" should read -- Stavanger --.

Item (57), Abstract, last line: "50% wt." should read -- 50 wt. %. --.

Signed and Sealed this
Twenty-fourth Day of March, 2020

Andrei Iancu
*Director of the United States Patent and Trademark Office*